No. 662,332. Patented Nov. 20, 1900.
W. A. WRIGHT.
TIRE.
(Application filed May 3, 1900.)
(No Model.)
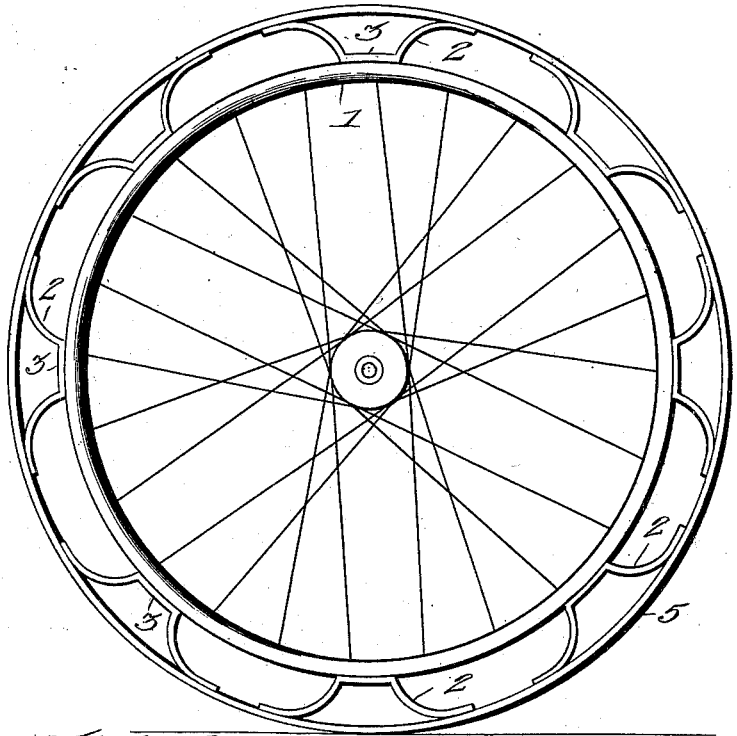
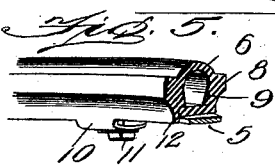
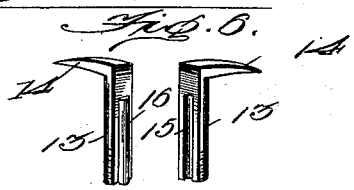
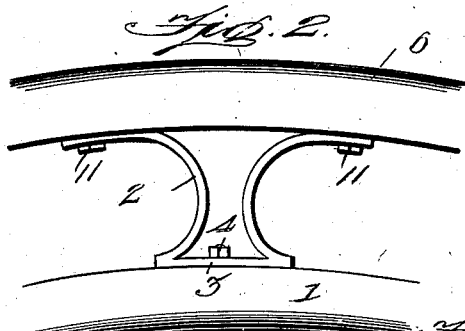
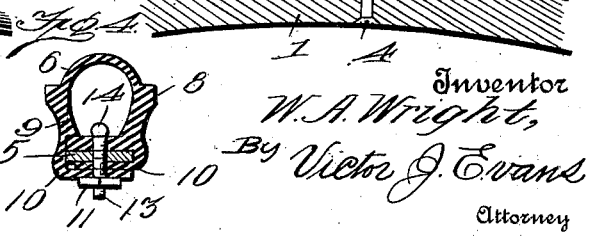
Witnesses
Inventor
W. A. Wright,
By Victor J. Evans
Attorney

UNITED STATES PATENT OFFICE.

WILLIAM A. WRIGHT, OF ATLANTA, GEORGIA.

TIRE.

SPECIFICATION forming part of Letters Patent No. 662,332, dated November 20, 1900.

Application filed May 3, 1900. Serial No. 15,385. (No model.)

*To all whom it may concern:*

Be it known that I, WILLIAM A. WRIGHT, a citizen of the United States, residing at Atlanta, in the county of Fulton and State of Georgia, have invented new and useful Improvements in Tires, of which the following is a specification.

This invention relates to new and useful improvements in tires especially adapted for use upon the wheels of carriages and other similar vehicles. Its primary object is to provide a resilient tire which may be readily applied to wheels of ordinary construction and the parts of which can be replaced when broken without requiring the services of a mechanic.

A further object is to provide a cushioned tread for the tire, which is secured in position by means of bolts of peculiar construction.

To these ends the invention consists of a hollow tread formed of a puncture-proof composition and secured by means of a split bolt to bow-springs placed at regular intervals about the rim of the wheel to which the tire is applied.

The invention also consists in providing a tread of peculiar form so constructed in cross-section as to support a weight without the assistance of air compressed therein.

The invention further consists in the novel construction and combination of parts hereinafter more fully described and claimed, and illustrated in the accompanying drawings, showing the preferred form of my invention, and in which—

Figure 1 is a side elevation of a wheel with a tire applied thereto. Fig. 2 is an enlarged side elevation of a section of a tire and rim. Fig. 3 is a longitudinal section therethrough. Fig. 4 is a transverse section through the tire. Fig. 5 is a perspective view of a section of the tire, and Fig. 6 is a similar view of the split bolt with the parts thereof detached.

Referring to said figures by numerals of reference, 1 is the rim of a wheel, which may be a solid tire of ordinary construction, and secured to this rim at regular intervals are bow-springs 2, which extend outwardly from connecting-strips 3, having perforations therein for the reception of bolts 4, whereby the springs are held in position. The free ends of the springs 2 are secured to a rim 5, formed preferably of spring-steel, and to which is secured the tread 6 of the tire. This tread is formed of any suitable puncture-proof material. I prefer, however, to make the same of a composition comprising fifty-five parts of the best rubber, ten parts of ground steel, fifteen parts of ground aluminium, and eight parts of taffeta silk, the balance of the composition comprising material similar to that used in tires of ordinary construction. This tire is molded in one piece and is provided with a passage extending longitudinally therethrough, substantially egg shape in cross-section, and projecting from each side of the tread near the center thereof is a longitudinally-extending ridge 8, and the wall 9 is thickened, as shown.

At points between the free ends of the springs 2 the tread 6 is provided with ears 10, which extend under the rim 5 of the tire and are engaged by screws or bolts 11. The tread is also provided at each side with longitudinally-extending flanges 12, which overlap the edges of the rim 5 and prevent lateral movement of the tread at points between the securing-bolts 11. Each of these bolts is formed of two sections, each comprising a semicylindrical stem 13, having an outwardly-extending arm 14 at one end thereof, and one of said stems is grooved within its flat surface, as at 15, for the reception of a tongue 16, formed upon the corresponding surface of the stem of the second section of the bolt. In securing the parts to the tread the bolts are inserted thereinto one at a time and the arms 14 thereof are turned, so as to extend in opposite directions within the passages 7, causing the tongues 16 to rest within the grooves 15. Nuts of ordinary construction are then screwed upon the threaded ends of the bolts and will, as is obvious, bind the parts thereof together and their withdrawal will be prevented.

When it is desired to attach my improved tire to a wheel, the springs 2 are secured to the tread, as hereinbefore described, and the same are then placed on the periphery of the rim of the wheel and secured thereto by means of the bolts 4. By this construction it will be seen that any one of the springs 2 may be quickly removed in the event of injury thereto by simply unscrewing the nut from each of the bolts 11 thereof and extracting the sections separately.

In the foregoing description I have shown the preferred form of my invention; but I do not limit myself thereto, as I am aware that modifications may be made therein without departing from the spirit or sacrificing the advantages thereof, and I therefore reserve the right to make such changes and alterations as fairly fall within the scope of my invention.

Having thus fully described my invention, what I claim as new, and desire to secure by Letters Patent, is—

1. In a tire, the combination with a flexible tread, of longitudinally-extending ridges and flanges, and springs secured to the tire at points between the flanges thereof.

2. In a tire, the combination with a flexible hollow tread having longitudinally-extending ridges and flanges thereto, of a resilient rim situated between said flanges, ears to the tread overlapping, and secured to, said rim, and springs.

3. In a tire, the combination with a hollow flexible tread having longitudinally-extending flanges, of a resilient rim seated between said flanges, ears to the tread extending over and secured to the rim, a spring, and means for detachably securing said spring to the rim.

4. In a tire, the combination with a flexible tread having thickened side walls, of a rim secured thereto, a spring, and a bolt connecting said spring, rim, and tread, said bolt comprising two semicylindrical stems and an arm to each stem.

5. In a tire, the combination with a hollow tread having longitudinally-extending ridges and flanges, of a spring-metal rim seated between the flanges, ears to the flanges overlapping, and secured to, the rim, a connecting-plate, curved springs extending from said plate to the rim, and bolts connecting said springs and tread, each bolt comprising a semicylindrical stem and an arm at one end thereof.

6. In a tire of the character described, a connecting-bolt comprising a groove, semicylindrical stem, an arm at one end thereof, a second similar stem having an arm thereto and a tongue upon the stem.

In testimony whereof I affix my signature in presence of two witnesses.

WILLIAM A. WRIGHT.

Witnesses:
E. P. DAMERON,
CHAS. A. READ.